United States Patent
Skinner

(10) Patent No.: US 6,717,804 B1
(45) Date of Patent: Apr. 6, 2004

(54) LIGHT-EMITTING LOCK DEVICE CONTROL ELEMENT AND ELECTRONIC DEVICE INCLUDING THE SAME

(75) Inventor: David N Skinner, Redwood Shores, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/261,720

(22) Filed: Sep. 30, 2002

(51) Int. Cl.7 .............................. G06F 1/16; G01D 11/28; G02F 1/1335
(52) U.S. Cl. ................. 361/683; 361/726; 362/283; 362/26; 206/214; 206/320; 349/58
(58) Field of Search .................. 361/680–686, 361/724–727; 362/283, 109, 26–29; 349/1, 58, 61–65; 264/250; 200/537, 314; 206/214, 320

(56) References Cited

U.S. PATENT DOCUMENTS

| | | | | |
|---|---|---|---|---|
| 5,025,919 A | * | 6/1991 | Brinker et al. .............. 206/214 |
| 5,253,142 A | * | 10/1993 | Weng ........................ 361/681 |
| 5,303,171 A | * | 4/1994 | Belt et al. ................... 713/321 |
| 5,359,492 A | * | 10/1994 | Porter ........................ 361/683 |
| 5,400,903 A | * | 3/1995 | Cooley ........................ 206/320 |
| 5,465,191 A | * | 11/1995 | Nomura et al. ............. 361/681 |
| 5,815,225 A | * | 9/1998 | Nelson ........................ 349/65 |
| 5,938,772 A | | 8/1999 | Welch |
| 6,209,011 B1 | | 3/2001 | Vong et al. |
| 6,365,855 B1 | | 4/2002 | Sutter et al. |
| 6,388,220 B1 | | 5/2002 | Sasaki et al. |
| 6,391,243 B1 | | 5/2002 | Howie, Jr. |
| 6,474,823 B1 | * | 11/2002 | Agata et al. ................. 362/26 |
| 6,494,593 B2 | * | 12/2002 | An et al. .................... 362/249 |

* cited by examiner

*Primary Examiner*—Darren Schuberg
*Assistant Examiner*—Lisa Lea-Edmonds

(57) ABSTRACT

A lock device control element that emits light. The light emitting lock device control element may be used in combination with an electronic device.

32 Claims, 4 Drawing Sheets

LIGHT-EMITTING LOCK DEVICE CONTROL ELEMENT AND ELECTRONIC DEVICE INCLUDING THE SAME

BACKGROUND OF THE INVENTIONS

Computers, which allow people to easily perform tasks such as word processing, spreadsheet calculations, database manipulation, mail message transmission, Internet searches for information, and connecting to nets, have become an Integral portion of the average person's life. This has led to the development of portable computers, such as laptop and notebook computers, which have proven to be a significant advance because they are relatively small and lightweight. More recently, a variety of hand-held (or palm sized) portable computers have been introduced. As a result, people are able to easily transport portable computers to remote locations where they can perform the same tasks that they could with their relatively immobile desktop computers.

Notebooks and other portable computers often include a user interface, with items such as a keyboard, dick buttons, scroll keys, touch pads and various indicator lights, and a display. Many portable computers also include two-part housings that are composed of two separate housing structures (e.g. a main housing and a display housing) that pivot relative to one another. The user Interface is carried by the main housing and the display is carried by the display housing such that the user interface and display will be protected within the housing when the housing is in the closed orientation. Housings are also commonly provided with locking devices that lock the main housing and display housing in the closed orientation.

The inventor herein has determined that conventional housing, user interface and display arrangements are susceptible to improvement. For example, the inventor herein has determined that users frequently dose notebook computers while the power is on when they take a break or move to a new location. The inventor herein has also determined that closing a notebook computer while the power is on can be problematic because the indicator lights, which may provide information that is vital to the user, are not visible when the computer is closed.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of Illustrating the general principles of the inventions. The present inventions are described below in the context of a portable computer. Nevertheless, the present inventions are not limited to portable computers or use therewith. Rather, the present inventions are applicable to any portable electronic device. Additionally, detailed discussions of various conventional internal operating components of computers which are not pertinent to the present inventions have been omitted for the sake of simplicity.

Figure 1:
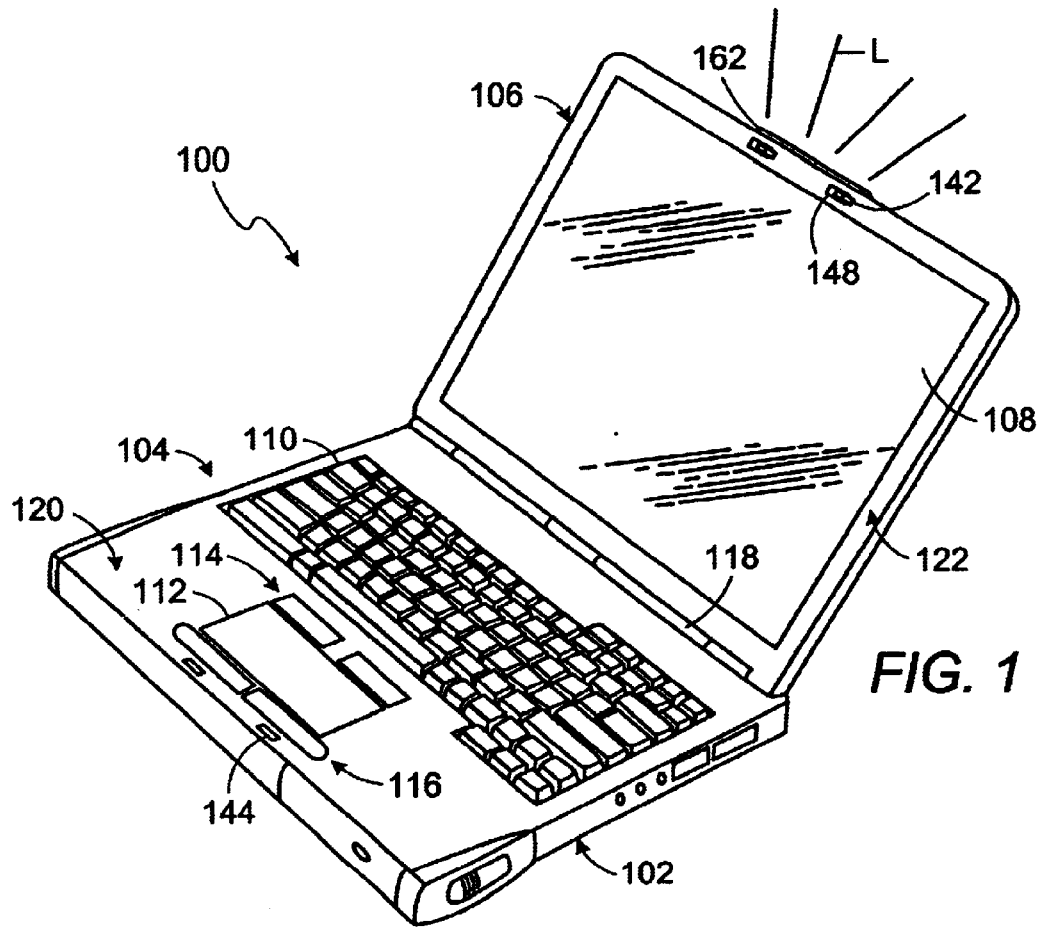
FIG. 1 is a perspective view of a portable computer in accordance with a preferred embodiment of a present invention in an open orientation.
Figure 2:
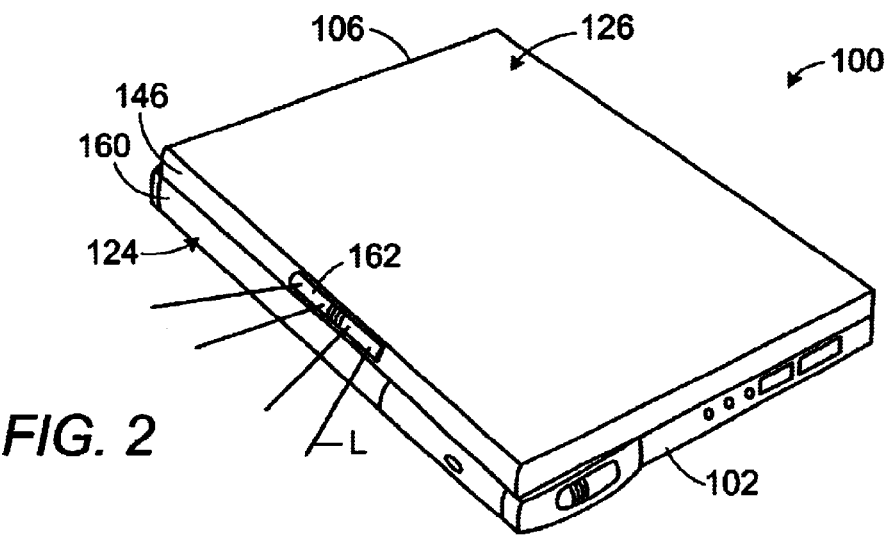
FIG. 2 is a perspective view of the portable computer illustrated in FIG. 1 in a closed orientation.
Figure 3:
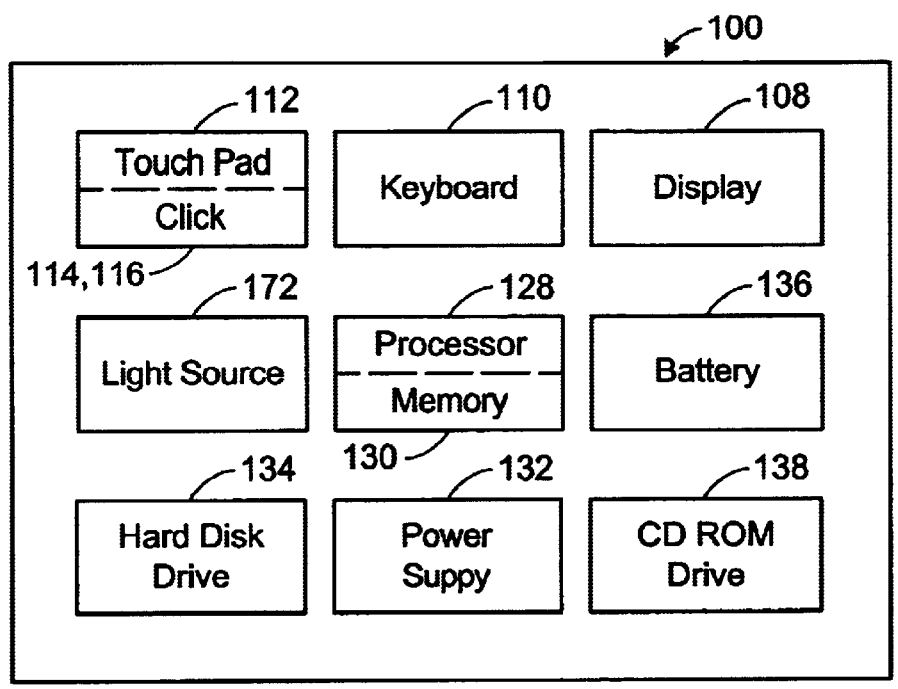
FIG. 3 is a block diagram showing various operating components of a portable computer in accordance with a preferred embodiment of a present invention.

Although not limited to any particular type of portable electronic device, one embodiment of a present invention is the exemplary notebook style portable computer 100 illustrated in FIGS. 1–5. Referring first to FIGS. 1–3, the exemplary portable computer 100 is, with respect to many of the structural and operating components, substantially similar to conventional portable computers such as the Hewlett-Packard Omnibook 6000 notebook PC. More specifically, the exemplary portable computer 100 includes structural components such as a two-part housing that consists of main housing 102, which supports a user interface 104 and houses various operating components, and a display housing 106, which supports a display 108. The user interface 104 allows the user to control the operations of the computer and, to that end, is provided with a keyboard 110, a touch pad 112, a first pair of right/left dick buttons 114 and a second pair of right/left dick buttons 116. The rear end of the main housing 102 is pivotaby connected to the rear end of the display housing 106 by a hinge 118. The hinge 118 allows the main housing 102 and display housing 106 to pivot relative to one another so that the computer can be oriented in the open orientation illustrated In FIG. 1 and the closed orientation illustrated in FIG. 2. Additionally, because the user interface 104 is associated with the inner portion 120 of the main housing 102 (i.e. the top portion) and the display 108 is associated with the inner portion 122 of the display housing 106 (i.e. the bottom portion), the outer portion 124 of the main housing (i.e. the bottom and side portions) and the outer portion 126 of the display housing (i.e. the top and side portions) form an outer shell that protects the user interface and display when the housing is in the closed orientation.

With respect to the operating components, and referring more specifically to FIG. 3, the main housing 102 houses a CPU (or "processor") 128, cache and RAM memory 130, a power supply 132, a hard disk drive 134, and a battery 136. A module bay for optional modules such as the illustrated CD-ROM drive module 138, a 3.5 inch disk drive module, or a ZIP drive module is also provided within the main housing 102. The exemplary portable computer 100 may also include other conventional components such as, for example, a modem, audio and video cards, headphone and microphone ports, serial, parallel and USB ports, keyboard and mouse ports, a 240-pin PCI connector for docking, an operating system such as Microsoft® Windows, and various application programs such a word processing, spreadsheets, security programs and games.

The exemplary portable computer 100 is also provided with a lock device that maintains the main housing 102 and display housing 106 in their closed orientation positions (FIG. 2) and a lock device control element that allows the user to unlock the lock device so that the main housing and display housing can be moved into their open orientation positions (FIG. 1). The lock device may be any suitable mechanical or electromechanical structure or system that is capable of maintaining the main housing 102 and display housing 106 In their closed orientation positions. The lock device control element is typically a movable (or "user-manipulatable") control element. The type of movement relative to the main housing 102 or display housing 106 depends on the control element's structure and the manner In which it is connected to the lock device. The movement may, for example, be side to side, front to back, In and out or rotational.

Regardless of the locking aspects of its structure, the lock device preferably includes a light emitting lock device control element. The light emitting lock device control element may generate its own light with a light source that is carried with control element or may simply be configured to allow light from a source within the computer housing to pass therthrough. There are a variety of advantages associated with a light emitting lock device control element. The light L from a light emitting lock control device would, for example, be readily visible to the user both when the computer housing is in the open orientation (FIG. 1) and when it is in the closed orientation (FIG. 2). As such, the light emitting lock control device could assume the function of one or more indicator lights and the user would be able to see the indicator light-based information regardless of whether the computer housing was in the open or closed orientation. Light source 172 is positioned within portable computer 100.

Figure 4:
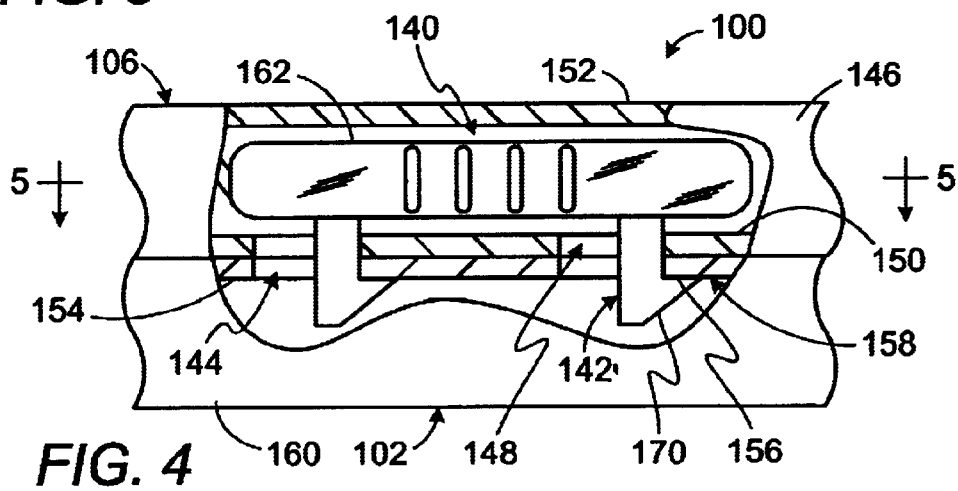
FIG. 4 Is a front, cutaway view of a portion of the portable computer illustrated in FIG. 1.
Figure 5:
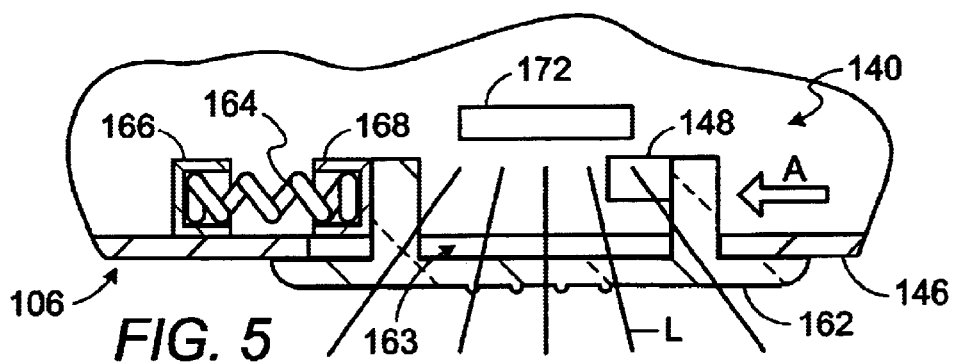
FIG. 5 is a partial section view taken along line 5—5 in FIG. 4.

The lock device in the exemplary embodiment illustrated in FIGS. 1–5 is a latch-based system 140 (FIGS. 4 and 5) which includes one or more latch members 142 that cooperate with one or more latch receiving apertures 144. Although this arrangement may be reversed, the latch members 142 in the exemplary implementation are carried by the display housing 106, while the latch receiving apertures 144 are formed in the main housing 102. The latch members 142 are movable between a latched (or "locked") position, which maintains the main housing 102 and display housing 106 in the closed orientation positions illustrated in FIG. 2, and an unlatched (or "unlocked") position which allows the main housing and display housing to be moved relative to one another. Referring more specifically to FIGS. 4 and 5, the latch members 142 in exemplary latch-based system 140 are positioned dose to the front wall 146 of the display housing 106 and extend through a pair of apertures 148 in the bottom wall 150 of the display housing. The exemplary display housing 106 also includes a top wall 152 as well as side and rear walls. When the computer 100 is In the closed orientation and the latch members 142 are In the latched position, the latch members extend through the latch receiving apertures 144 in the top wall 154 of the main housing 102 and the latch surfaces 156 engage the underside 158 of the top wall. The latch receiving apertures 144 are located near the front wall 160 of the main housing 102, which also includes bottom, side and rear walls.

The lock device control element in the exemplary embodiment illustrated In FIGS. 1–5 is a slidable knob 162 that is positioned on the exterior of the display housing front wall 146 and connected to the latch members 142. The slidable knob 162, which rides along a slot 163, is movable between latch and unlatch positions that correspond to the latch and unlatch positions of the latch members 142. The latch members 142 and slidable knob 162 may be an integrally formed unit, or separate elements that are connected to one another. When the user slides the knob 162 from the latch position to the unlatch position (note arrow A in FIG. 5), the latch members 142 move from the latched positions shown in FIGS. 4 and 5 to the unlatched positions, and the latch surfaces 156 are aligned with the latch receiving apertures 144. The main housing 102 and display housing 106 may then be moved relative to one another to open the exemplary computer 100.

Although the present inventions are not limited to such an arrangement, the exemplary latched-based system 140 illustrated in FIGS. 4 and 5 is preferably biased to the latched position. In the illustrated embodiment, a spring 164 or other suitable biasing element biases the latch members 142 and/or the slidable knob 162 to the latched position. One end of the spring 164 is secured to a portion of display housing 106, such as the front wall 146, by an anchor 166 and the other end is secured to one of the latch members 142 and/or the slidable knob 162 by an anchor 168. Additionally, the latch members 142 may be provided with sliding surfaces 170, which cause the latch members to move toward the unlatched position when the main housing 102 and display housing 106 come together. Such sliding surfaces 170 are especially useful in those instances where a biasing element is employed.

As noted above, the lock device preferably includes a light emitting lock device control element that either generates its own fight or allows light from another source to pass therethrough. To that end, the slidable knob 162 in the exemplary embodiment illustrated in FIGS. 1–5 is translucent and a light source 172 is positioned within the display housing 106. Suitable translucent materials for the slidable knob 162 include polycarbonates, acrylics, polyesters and polystyrenes. Alternatively, one or more predetermined portions of the slidable knob 162 may be translucent while other portions are opaque. Another alternative is for the slidable knob 162 to simply have a plurality of holes that allow light to pass therethrough. The light source 172, which is preferably controlled by its own dedicated controller or by the CPU 128, may be any suitable light emitting device. Such devices include, for example, light emitting diodes, electroluminescent strips, incandescent bulbs, and fluorescent tubes. The light emitting slidable knob 162 may be used merely for decorative purposes or may be used as an indicator to provide the user with information. In one exemplary implementation, light emission from the slidable knob 162 may be used to indicate "power on," "sleep mode" (i.e. a lower power consumption mode) and "blue tooth transmission." A continuous emission of light could be used to indicate that the power is on, relatively low frequency pules of light (i.e. light turned on and off at a relatively low frequency) could be used to indicate that the power is on and that the computer is in sleep mode, and relatively high frequency pulses of light could be used to indicated that power is on and that a blue tooth transmission is proceeding.

It should be emphasized that the present inventions are not limited to any particular types of information or light-based manner of conveying it. The light source 172 may be configured to pro light in different colors in order to expand the number of indications that may be provided. For example, if the colors were white and red, the "power on" "sleep mode" and "blue tooth transmission" indications could be provided in white light when the battery 136 is sufficiently charged (i.e. is charged above a predetermined level), or when the computer is running off of a wall outlet or other separate power source, and could be provided in red light when the battery is running low. Similarly, the slidable knob 162 could be configured such Mat there are two differently colored translucent portions (e.g. a clear portion and a translucent red portion) that may or may not be separated by an opaque region. Here, the light source 172 may be configured to direct light through either one of the portions individually, or through both portions simultaneously, depending on the message to be conveyed.

Figure 6:
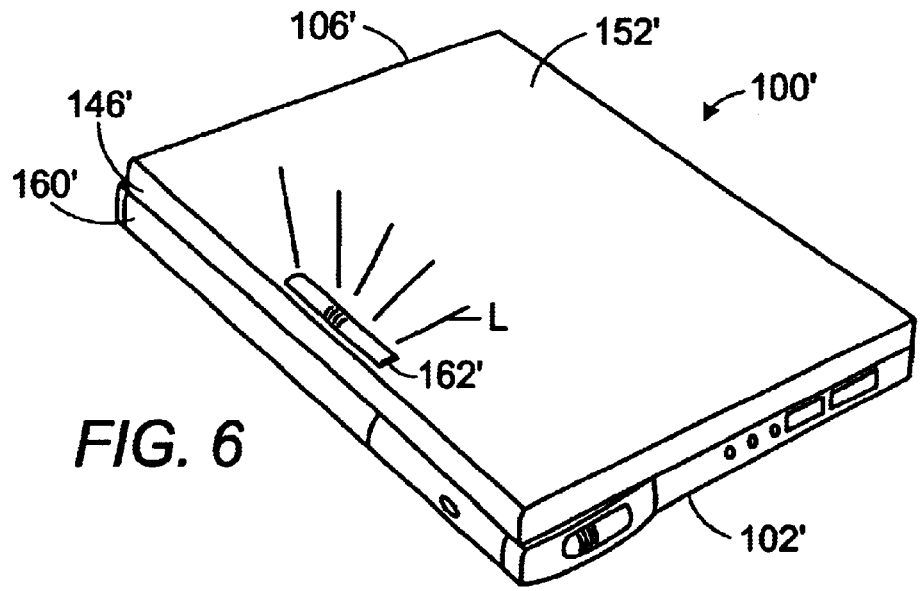
FIG. 6 is a perspective view of a portable computer in accordance with a preferred embodiment of a present invention in a closed orientation.
Figure 7:
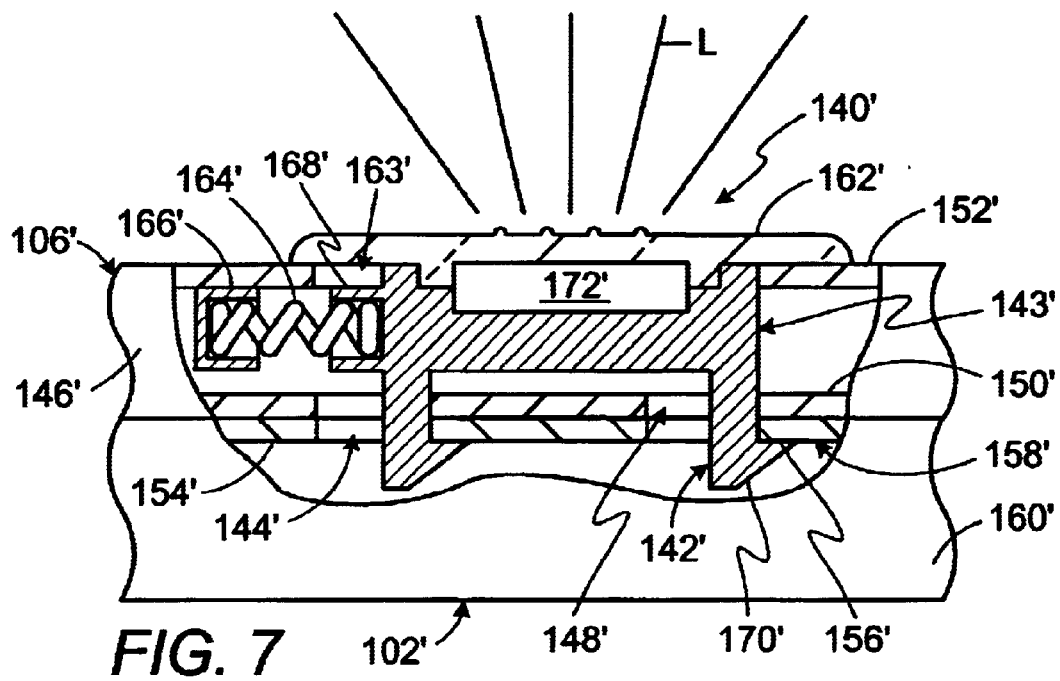
FIG. 7 is a front cutaway view of a portion of the portable computer illustrated in FIG. 6.

Another exemplary notebook computer in accordance with the present inventions is generally represented by reference numeral 100' in FIGS. 6 and 7. The exemplary computer 100' is substantially similar to the exemplary computer 100 illustrated in FIGS. 1–5 and similar elements are identified by similar reference numerals. For example, the exemplary computer 100' includes a main housing 102' that houses varous operating components and supports a user interface (not shown) as well as a display housing 106' that supports a display (not shown). A latched-based lock system 140', which includes a pair of latch members 142' and a slidable knob 162', is also provided. Here, however, the slidable knob 162' is positioned on the top wall 152' of the display housing 106' and the light source 172' is carried with the slidable knob. Preferably, the slidable knob 162' are dose to the display housing front wall 146'.

The exemplary latch members 142' are positioned dose to the front wall 146' of the display housing 106' and extend through a pair of apertures 148' in the bottom wall 150' of the display housing. When the computer 100' is in the closed orientation illustrated in FIGS. 6 and 7, and the latch members 142' are in the latched position, the latch members extend through the latch receiving apertures 144' in the top wall 154' of the main housing 102' and the latch surfaces 156' engage the underside 158' of the top wall. The latch receiving apertures 144' are located near the front wall 160' of the main housing 102'. Sliding surfaces 170' may also be provided in order to facilitate entry of the latch members 142' into the latch receiving apertures 144'.

In the exemplary embodiment illustrated in FIGS. 6 and 7, the latch members 142' are carried by (and preferably integrally formed with) a latch base 143'. The latch base 143', which rides along a slot 163', also carries the slidable knob 162' and the light source 172'. The latch members 142', latch base 143', slidable knob 162' may, alternatively, be an integrally formed unit that carries the light source 172'. In either case, a spring 164' or other suitable biasing element biases the latch base 143' (and, accordingly, the latch members 142' and slidable knob 162') to the latched position. One end of the spring 164' is secured to a portion of display housing 106' by an anchor 166' and the other end is secured to the latch base 143' by an anchor 168'.

As described in greater detail above with reference to FIGS. 1–5, lock devices in accordance with the present inventions preferably include a light emitting lock device control element that either generates its own light or allows light from another source to pass therethrough. In the exemplary implementation illustrated in FIGS. 6 and 7, the slidable knob 162' is translucent and a light source 172', which functions in the manner described above, is positioned behind the slidable knob. Here too, the slidable knob 162' may be modified in a variety of ways to suit particular situations. For example, the latch base 143' could carry a pair of laterally spaced light sources 172' and the slidable knob 162' could be composed of a pair of differently colored translucent portions that are separated by an opaque portion and are respectively aligned with the light sources. The slidable knob 162' could also be formed from opaque material and have a plurality of holes that are aligned with the light source 172' in order to allow light emitted by the light source to pass through the slidable knob.

Figure 8:
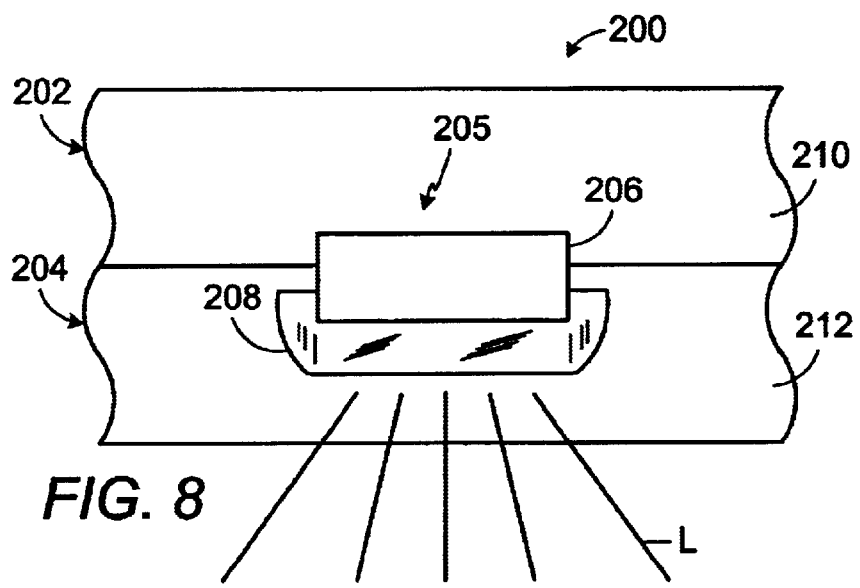
FIG. 8 is a front view of a portion of a portable computer In accordance with a preferred embodiment of a present invention.
Figure 9:
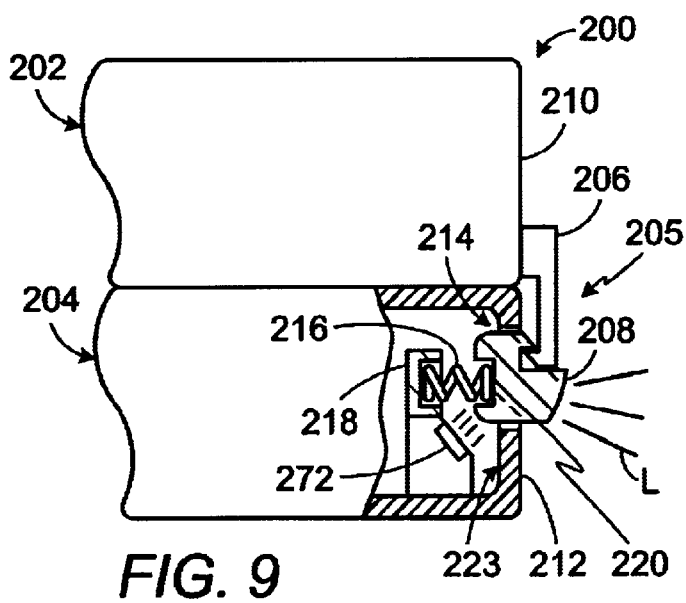
FIG. 9 is a side, cutaway view of a portion of the portable computer illustrated in FIG. 8.

Still another exemplary notebook computer in accordance with the present inventions is generally represented by reference numeral 200 in FIGS. 8 and 9. The exemplary computer 200 is substantially similar to the computer 100 illustrated in FIGS. 1–5 with respect to the operating components and the majority of the structure components. For example, the exemplary computer 200 includes a display supporting display housing 202 that supports a display (not shown) and a main housing 204 that houses various operating components and supports a user interface (not shown). The display housing 202 and main housing 204 are pivotably secured to one another in the manner described above with reference to FIG. 1 and a lock system 205 maintains the display housing and main housing in the closed orientation. More specifically, the display housing 202 is provided with a latch 206, which may be integral with the display housing or a separate structure element (as shown), and the main housing 204 is provided with a depressible button 208 that engages the latch. The latch 206 and depressible button 208 are respectively associated with the front walls 210 and 212 of the display housing 202 and main housing 204. The depressible button 208 extends through an opening 214 in the main housing front wall 212 and is biased to the locked position illustrated in FIG. 9 by a spring 216 or other suitable biasing device. One end of the spring 216 is held by an anchor 218 and the other end is held by an anchor 220 that is formed in depressible button 208. A pair of stops 222 (one of which is visible in FIG. 10) extend outwardly from the lateral edges of the depressible button 208 and engage the inner surface 223 of the main housing front wall 212.

Figure 10:
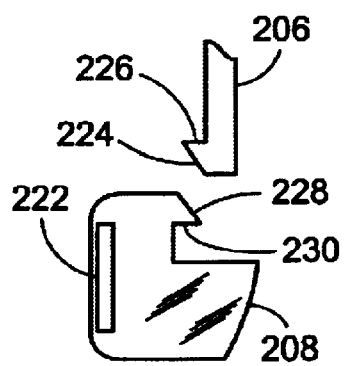
FIG. 10 is a side view of the latch and button illustrated in FIGS. 8 and 9.

With respect to the locking of the exemplary lock system 205, and referring more specifically to FIG. 10, the exemplary latch 206 includes a sliding surface 224 and a latch surface 226, while the exemplary depressible button 208 includes a sliding surface 228 and a locking surface 230. As the display housing 202 is moved into the closed orientation position illustrated in FIGS. 8 and 9, the sliding surface 224 on the latch 206 engages the sliding surface 228 on the depressible button 208 and cause the depressible button to move inwardly against the biasing force of the spring 216 until the latch sliding surface moves past the button sliding surface. The biasing force of the spring 216 then urges the depressible button 208 outwardly, where the latch surface 226 is engaged by the locking surface 230. [Note FIG. 9.] The lock device 205 may be unlocked by pressing the depressible button 208, thereby disengaging the latch surface 226 and the locking surface 230.

As described in greater detail above with reference to FIGS. 1–5, lock devices in accordance with the present inventions preferably include a light emitting lock device control element that either generates its own light or allows light from another source to pass therthrough. In the exemplary implementation illustrated in FIGS. 8–10, the depressible button 208 is translucent and a light source 272, which functions in the manner described above, is positioned within the main housing 204 such that it directs light through the translucent depressible button. Here too, the depressible button 208 may be modified in a variety of ways to suit particular situations. For example, one or more predetermined portions of the depressible button 208 may be translucent while other portions are opaque. Alternatively, the depressible button 208 may simply have a plurality of holes that allow right to pass therethrough.

Although the present inventions have been described in terms of the preferred embodiments above, numerous modifications and/or additions to the above-described preferred embodiments would be readily apparent to one skilled in the art. By way of example, but not limitation, the light source may be the backlight for the computer display when a backlit display is used. The present inventions are also applicable to electronic devices that are configured such that the user interface and display are both associated with the main housing. The second part of the two-part housing may simply be a cover that is pivotable or otherwise movable relative to the main housing, or even removable. Here too, a lock device with a light emitting lock device control element may be provided. Examples of such electronic devices include personal digital assistants and pen-based computers. It is intended that the scope of the present inventions extend to all such modifications and/or additions.

I claim:

1. An electronic device, comprising:
   a housing defining an exterior and including first and second housing members movable relative to one another between an open and a closed orientation; and
   a lock device configured to lock the first and second housing members in the closed orientation and including a light emitting user-manipulatable lock device control element associated with the exterior of the housing.

2. An electronic device as claimed in claim 1, further comprising:
   a display carried by the first housing member, and
   a keyboard carried by the second housing member.

3. An electronic device as claimed in claim 1, wherein the first and second housing members are pivotably secured to one another.

4. An electronic device as claimed in claim 3, wherein the housing defines a forward end and a rear end, the first and second housing members are pivotably secured to one another at the rear end, and the light emitting user-manipulatable lock device control element is associated with the forward end.

5. An electronic device as claimed in claim 4, wherein the first housing member defines a top surface and a plurality of side surfaces and the light emitting user-manipulatable lock device control element is associated with the top surface.

6. An electronic device as claimed in claim 4, wherein the first housing member defines a top surface and a plurality of side surfaces and the light emitting user-manipulatable lock device control element is associated with one of the side surfaces.

7. An electronic device as claimed in claim 1, wherein the lock device includes a latch.

8. An electronic device as claimed in claim 7, wherein a latch receiving aperture is formed on of the first and second housing members and the latch carried by the other of the first and second housing members such that the latch extends through the latch receiving aperture when the first and second housing members are in the closed orientation.

9. An electronic device as claimed in claim 7, wherein the latch is movable between a latch position and an unlatch position and is biased to the latch position.

10. An electronic device as claimed in claim 1, wherein at least a portion of the light emitting user-manipulatable lock device control element is substantially translucent.

11. An electronic device as claimed in claim 1, wherein the housing includes a light source tat directs light though the light emitting user-manipulatable lock device control element.

12. An electronic device as claimed in claim 1, wherein a light source is carried with the light emitting user-manipulatable lock device control element.

13. An electronic device as claimed in claim 1, wherein the light emitting user-manipulatable lock device control element is slidable.

14. An electronic device as claimed in claim 1, wherein the light emitting user-manipulatable lock device control element is depressible.

15. An electronic device, comprising:
    a housing defining an exterior and including first and second housing members movable relative to one another between an open orientation and a closed orientation;
    a lock device configured to lock the first and second housing members in the closed orientation and including a user-manipulatable lock device control element associated with the exterior of the housing; and
    means for causing light to be emitted from the user-manipulatable lock device control element.

16. An electronic device as claimed in claim 15, further comprising:
    a display carried by the first housing member; and
    a keyboard carried by the second housing member.

17. An electronic device as claimed in claim 15, wherein the first and second housing members are pivotably secured to one another.

18. An electronic device as claimed in claim 15, wherein the lock device includes a latch.

19. An electronic device as claimed in claim 15, wherein at least a portion of the user-manipulatable lock device control element is configured to allow light to pass therethrough and the means for causing light to be emitted emits light through the user-manipulatable lock device control element.

20. An electronic device as claimed in claim 15, wherein at least a portion of the means for causing light to be emitted is carried with the user-manipulatable lock device control element.

21. An electronic device as claimed in claim 15, wherein the means for causing light to be emitted causes light to be emitted from the user-manipulatable lock device control element when the electronic device is operating.

22. An electronic device as claimed in claim 21, further comprising:
    a battery;
    wherein be means for causing light to be emitted causes light to be emitted from the user-manipulatable lock device control element in a first color when the electronic device is operating and the battery is in a normal power state and causes light to be emitted from the user-manipulatable lock device control element in a second color when the electronic device is operating and the battery is in a low power state.

23. An electronic device as claimed in claim 15, wherein the means for causing light to be emitted causes light to be emitted from the user-manipulatable lock device control element in pulses when the electronic device is operating in sleep mode.

24. A method of operating an electronic device including a housing and a lock device with a lock device control element, the method comprising the step of:
    emitting light from the lock device control element.

25. A method as claimed in claim 24, wherein the step of emitting light from the lock device control element comprises emitting pulses of light from the lock device control element.

26. A method as claimed in claim 24, wherein the step of emitting light from the lock device control element comprises emitting light continuously from the lock device control element when the electronic device is operating in a first mode and emitting pulses of light from the lock device control element when the electronic device is operating in a second mode.

27. A method as claimed in claim 24, wherein the step of emitting light from the lock device control element comprises emitting light of a first color from the lock device control element in response to a normal battery power state and emitting light from the lock device control element in a second color in response to a low battery power state.

28. A computer, comprising:

a main housing that defines top, bottom and side portions;

a processor located with the main housing;

a user interface associated with the top portion of the main housing;

a display housing that defines top, bottom and side portions;

a display associated with the bottom portion of the display housing;

a hinge that pivotably connects the main housing to the display housing such that the main housing and display housing are movable relative to one another between a closed orientation, where the top portion of the main housing abuts the bottom portion of the display housing, and an open orientation; and a lock device, associated with the main housing and display housing, including a latch and a light emitting user-manipulatable lock device control element.

29. A computer as claimed in claim 28, wherein the main housing includes a latch receiving aperture;

the latch and light emitting user-manipulatable lock device control element are operably connected, carried by the display housing, and movable between respective latch positions and an unlatch positions; and the latch extends through the latch receiving aperture and engages the main housing when the display housing is in the closed orientation and the latch is the latch position.

30. A computer as claimed in claim 28, wherein the display housing includes a latch; and the light emitting user-manipulatable lock device control element is configured to engage the latch and is movable between a latch position and an unlatch position.

31. A computer as claimed in claim 28, wherein the light emitting user-manipulatable lock device control element is configured to allow light to pass therethrough.

32. A computer as claimed in claim 28, wherein a light source is carried with the light emitting user-manipulatable lock device control element.

* * * * *